United States Patent Office 3,459,559
Patented Aug. 5, 1969

3,459,559
DISPERSIBLE FOOD COMPOSITIONS
Robert M. Harris, Arlington Heights, Edward A. Knaggs, Deerfield, and John A. Yeager, Winnetka, Ill., assignors to Stepan Chemical Company, Northfield, Ill., a corporation of Delaware
No Drawing. Filed Aug. 9, 1965, Ser. No. 478,463
Int. Cl. A23l 1/34; B01f 17/30; C11d 1/14
U.S. Cl. 99—78　　　　　　　　　　　　　5 Claims

ABSTRACT OF THE DISCLOSURE

Rapidly-soluble flavor composition of a water insoluble acidulant admixed with a water soluble alpha sulfo anionic surfactant and a water soluble nonanionic surfactant having hydrophobe and hydrophile groups within its molecule.

---

The instant invention relates to rapidly-soluble and/or rapidly dispersible flavor compositions which are used in dilute aqueous systems, usually dilute beverage systems, but are not limited to this category of composition. Instead, it will be understood that the instant invention affords compositions particularly useful in aqueous systems and/or vehicles in foods and/or edible materials and/or materials suitable for human and/or animal consumption, which include jelly, jam, preserves, jells, vitamin formulations, cheese, dessert sherberts and ices, salad preparations, fruits (concentrated and ready to use diluted forms), canned vegetables and fruits, beverages, margarines, various animal feeds, wines and other alcoholic beverages, drugs and/or pharmaceuticals. Because the advantages of the invention are often most easily demonstrated in connection with its use in beverage vehicles, however, this use is described in greater detail herein.

As is well known by this time, the greatest user of pre-mixed beverage compositions sold in the common marketplace is the housewife and the housewife has developed a pseudoscientific concept concerning the same, even if the housewife does not look upon these materials as the various combinations and/or complexes of chemicals which the skilled chemist in the art might consider them to be.

For example, some ten to fifteen years ago monosodium glutamate was a term which not only became well known to the housewife as a chemical term but also as the so-called "fifth taste," for use by the housewife with salt and similar materials in the flavoring of meat and the like. Since then many other so-called "flavors" have become well known to the housewife and their use in combination with other materials and/or flavors has also become well known to the housewife. Still another classic example involves the use of saccharin compounds, which were included in the earlier non-caloric sweeteners or sugar-type "flavors." At least with respect to certain consumers these last-mentioned flavors suffered somewhat from what was believed to be a moderately bitter aftertaste or at least an undesirable aftertaste with respect to these consumers. This fact became recognized by the housewife and the marketability of compounds containing the same suffered accordingly. Subsequently, certain additional sweetening "flavors" were added to beverages containing saccharin compounds, and these additional sweeteners included the so-called "cyclamates," which were also considered to have no caloric value, but which in combination with the saccharins seem to give at least to certain consumers a richness in sweetened taste which enhanced the overall marketability of beverages involving the use of the combination of these two sweetener types of flavors.

Although it is true that the instant invention is concerned only in part with the foregoing types of "sweetener" flavors, the instant invention is concerned with certain combinations of flavors and the foregoing are mentioned as exemplary of sophistication in this field not only among flavor chemists but also among the housewives themselves. It so happens that it is not always possible to extract and/or reproduce the exact chemical which is presumably the cause of flavor in a given beverage or synthetic fruit juice, to the extent that the consumer is impressed with either the reproduction or the improvement of any synthetic beverage over the so-called "nonsynthetic" and/or original beverage extract from a particular fruit or vegetable. It is not represented that this is always the case, but it is sometimes the case. For example, over a period of years, it has been known that citric acid and/or its known salts such as sodium citrate and the like have a flavor resembling (and/or are extractible from) lemon juice and the juices of various citric fruits, and chemicals of this particular class are generally classified as "acidulants" by flavor chemists. It is not to be unexpected that the housewife (herein considered as typical of chemically unskilled users) would soon discover that various acidulants had different taste effects in beverages or otherwise; nor is it expected that chemists would find that they all behaved in the same manner for their own purposes in the making of beverages and/or beverage components (and/or others of the materials hereinbefore mentioned) for the marketplace.

The instant invention is concerned with certain acidulants and their preparation and use for and in the marketplace; and attention is called to the following patents of interest which were collected as being helpful in an examination of the prior art; although it is not represented that any one of these is anticipatory of the particular invention here involved:

| 2,982,653 | 3,016,300 |
| 3,009,810 | 3,108,002 |
| 3,009,811 | 3,152,909 |
| 3,011,894 | 3,181,953 |
| 3,016,299 | 3,181,954 |

The instant invention is concerned with certain relatively complicated physical and/or chemical phenomena, even though the end results of the same might be recognized superficially by the housewife. The physical and/or chemical phenomena involved include those of readily dispersing certain acidulants in cold water. It is known that acidulants such as citric acid will dissolve comparatively readily in cold water, even ice water, under most circumstances and this is a fact which the housewife can readily observe in any instance involving the stirring of a suitable carbonated or non-carbonated beverage flavor blend of citric acid and/or salt thereof into cold water. The readily soluble and/or dispersible material disappears quickly upon stirring, whereas the material that is not readily soluble and/or dispersible will not disappear into the beverage vehicle, but will remain floating on top or stuck to the spoon, or otherwise in an undispersed condition which the housewife can readily observe. It will thus be appreciated that whatever the complications of the physical and/or chemical theories that may be involved, the net result is easily observable by the housewife in the simple attempt, for example, to use a dry powder to formulate a given cool beverage using previously-cooled water or simulated types of previously cooled beverage material and/or related vehicles, such as carbonated water or the like and/or to formulate more viscous liquids such as jams, jellies, preserves, drug or vitamin formulations, etc. (which may be considered herein as flavored beverage-like materials or at least flavored liquid vehicles, even if concentrated). At the same time, the housewife does not need to be any scientific genius to recognize quite readily dissatisfaction with the ease of dispersibility of various solid flavors, including the particular acidulant used in a given beverage composition.

The net result of the foregoing is that the housewife will readily recognize either that the materials used in any pre-compounded formulation sold at the marketplace for cool drinks may very well leave a great deal to be desired either in ability to freely and quickly disperse in the cold beverage vehicle and/or ability to satisfy the particular taste of the consumer. With respect to the person who stands in the shoes of the seller of completed beverages of this type, it must be appreciated that the problems of the housewife cannot be avoided, and there is an additional problem of having comparatively non-dispersible materials precipitate or separate out of the beverage and fall into the bottom thereof during standing. In glass containers, this is, of course, a disasterous situation from the marketable point of view, because the housewife will assume that the precipitated material is a form of undesirable contamination.

In spite of all of its commercial use in the formulation of beverages or related compositions involving citric acid and/or its salts, it must be appreciated that citric acid alone does not necessarily satisfy fully the "marketability" for a number of compositions which the user might choose (from the point of view of its cost, its hygroscopic character tending to cause agglomeration, its inadequate storage properties, or otherwise). This leads us directly to the particular invention which involves the use of a partial or complete substitute for citric acid and its salts as a "flavor" and/or additive for any given vehicle in dilute concentrations, particularly to cold temperature vehicles.

It will thus be seen that an important aspect of the instant invention consists in a method of producing a composition and/or such composition per se adapted for rapid substantially complete dispersion in dilute concentrations of aqueous beverage liquids or related vehicles at various temperatures including those cool to the human touch, comprising concentrated beverage components containing an acidulant component consisting essentially of (I) a relatively water-insoluble acidulant material (e.g. fumaric and adipic acids being typical), which material has been treated to render the same water-soluble and/or dispersible by intimately admixing therewith minute amounts of a combination of (x) alpha-sulfo anionic surfactant and (y) selected nonionic surfactant, said mixture (I)(x)(y) being a substantially homogeneous, free-flowing, dry particulate, non-toxic mixture having a particle size range substantially 25 to 250 microns (but including some as low as 5 microns).

It will be noted that such terminology as "at below human body temperature" and/or "at temperatures cool to the human touch" is used herein in reference to the liquid vehicle employed, and it will be appreciated that this is not only the generic description for cool beverages, but it represents a description for aqueous systems in which solubility and/or dispersibility is recognized by the chemist as being considerably more difficult than it would be in warmed liquids of comparable chemical composition. This language is used for ease of understanding of the instant disclosure which is addressed not only to the skilled food chemist but also the comparatively unskilled end user, e.g. the housewife. This particular property adds considerably to the marketability of the product, for the reason that the housewife would definitely have a preference for a formulation which could be used in pre-cooled water or other beverage taken directly from the refrigerator, such that the ultimately formulated beverage could be served in the minimum length of time to the ultimate consumer. Unless a beverage is below human body temperature, or even preferably below about 10° C., any beverage would hardly classify as being a cooled beverage, or cool to the human touch; and the chemist who would be inclined to be somewhat more scientific about this approach would consider that 10° C., or perhaps 4° to 6° C., is a cutoff point that is sufficiently cool and/or drastically below any temperature which he might prefer to accelerate solution or dispersion of any material not readily prepared to go into solution or dispersion.

Also, with respect to the use of the terminology "solution" or "dispersion," we are not overlooking the fact that to the physical chemist the distinction between these terms may be quite great; but to the general observer which would include the housewife and those persons to whom the instant disclosure is addressed generally, this particular distinction is not recognized. Generally uniform distribution of the individual solid particles in the liquid vehicle is required by the ordinary user only to the extent that they are not readily observable. Thus, in an aqueous system, clouds or actual insoluble floaters, curds or precipitants would not be considered acceptable as dispersible materials, but the term "water-soluble" which is often used for this purpose by the ordinary housewife has come to mean merely that the material gives the appearance of having dissolved in the aqueous system, i.e., it is so finely dissolved and/or dispersed in the concentrations of use that for practical purposes at least there does not appear to be any distinction between solution and/or dispersion. In other words, whatever coloring material might be used in the beverage and/or whatever carbonation might be used in the beverage might appear to the naked eye, but solid undispersed and/or undissolved particles would not appear to the ordinary user (i.e. the housewife), so even though the terms "solution" and "dispersion" may be used interchangeably herein, it will be appreciated that the ultimate test for use herein is the test of the marketplace and/or the housewife (i.e. the ultimate user), which merely means that there is a "substantially complete solution" in the particular dilute concentrations employed to the extent that to the naked eye there is the desirable clear appearance ordinarily associated with true solution. In using such a definition we are not overlooking the fact that elaborate studies have determined, for example, that substantially the complete flavor or taste characteristics of such "flavors" as tartaric acid are achievable in apparently clear liquid vehicles, even though more exact and detailed physical and chemical examination of such systems appear to reveal that such tartaric acid is actually in extreme discrete dispersion rather than solution (if used in high enough concentrations). Niceties of this type are not of particular concern herein, primarily for the reason that they do not represent something visible to the naked eye of the user, although the situation would be otherwise if the dispersed materials were to represent an undesirable appearance. Also, it must be appreciated that colors which are often added to various synthetic beverages are intended to be visible and the instant invention does not preclude the inclusion of selective colored components employed for such purpose.

It will be appreciated that the concentrated beverage components (as are the acidulant portion thereof) are preferably dry and powdery or free-flowing to the touch; and may contain pulverized sugar and/or such non-caloric substitutes as those previously mentioned, plus additional flavors, colors, etc. all of which in the dry form of said beverage components embodying the invention are in readily soluble or dispersible form vis a vis the beverage liquid. In embodiments of the invention involving the flavored beverage composition per se, of course, such specifications would not be realistic; and instead all of such beverage components would already have been dispersed and/or dissolved, as previously defined. Likewise, powdered material, sugar and/or non-caloric substitutes therefor (characteristic of the examples already mentioned) may be employed, in either phycial form of beverage components (i.e. solid or dissolved, or even normally liquid). The beverage vehicle is quite obviously either water or ethanol-aqueous in concentrations of ethanol suitable for human consumption; but such vehicle may also be carbonated in conventional manner. In substance, it is the general intent that each of the elements defined in this paragraph, as well as the resulting flavored beverage, be composed such that the whole of such combination is palatable and non-toxic to the ordinary individual and/or each individual ingredient thereof (whether dissolved or not) is thus so palatable and/or non-toxic in the particulate forms, concentrations, combinations, etc. ultimately contemplated in the finally prepared "resulting flavored beverage." This consideration of the invention will not preclude other uses of obviously non-toxic chemicals such as fumaric acid and the other acidulants referred to herein.

Dispersibility is the "visual" (possibly unscientific but extremely practical) test of the housewife, or other observer using only the naked eye as the "testing instrument." Still another "visual" test of undesirable marketability which the instant invention seeks to avoid results from the fact that hygroscopic acidulants without the pre-treatment of the invention, tend to cake upon standing, with or without dextrose or common sugar and/or similar additives; and non-hygroscopic acidulants (such as fumaric acid) may tend to become too dusty to handle easily, without the pre-treatment of the invention.

Expressed in general terms, the instant invention consists in (A) an aqueous beverage and/or food composition and/or (B) an aqueous liquid concentrate useful in the formulation of (A) and/or (C) an essentially dry flavor composition useful in making (A) and/or (B), such composition in each case being a flavor composition. In general, the flavor compositions are used in amounts sufficient to give a desired taste and not used in such beverage and/or other food or drug vehicles in concentrations outside the practical ranges of 1% to 0.001% by weight.

Certain definitions may be helpful in further specifying the parameters of the instant invention. The terms "food" and/or "food composition" are here used to define all compositions fit for animal consumption (i.e., as mentioned in the first paragraph hereof), thereby including jams, jellies, etc., drugs, pharmaceuticals (adapted for oral administration), etc., as well as beverages in the more limited sense of the term "beverage." The term "flavor" is actually generic to "acidulant," "sweetener" and specific other flavors of natural or artificial origin such as fruit flavors, etc. Sweeteners include sugars, dextrose, fructose, etc. from natural sources as well as saccharins, cyclamates, stevioside, etc. The term "other flavors" used herein is intended merely as an abbreviation for "flavors other than the acidulants and sweeteners described herein."

One essential characteristic of such dry or concentrated composition (C) is that it contains ingredients which are recognized as readily water-soluble in the generally aqueous beverage vehicle. This is not a characteristic of the crude untreated acidulant such as fumaric acid per se; but it is a characteristic of some finely pulverized acidulants which include such typical water-soluble acidulants as citric acid and its palatable and-or non-toxic salts. As a general rule, such "water-soluble" acidulant may be readily prepared in intimate mixtures with the relatively water insoluble acidulant components, in the weight ratios mentioned and in particle sizes within the ranges specified for the mixture. In fact, as a rule of thumb which both the skilled food chemist and the housewife recognize, the free-flowing powdered form of citric acid per se, in the previously described particle size possesses the "water-soluble" characteristic of not only entering into substantial water solution in less than five times its own weight of cool water, but also being capable of this phenomenon in up to one to six minutes of time (which equals the dissolving time for dextrose) using ordinary vortex-type stirring (typical of housewife use) at a weight concentration of substantially 1% or less. (As used herein, the terms "parts" and "percent" mean parts and percent by weight unless otherwise specified.) Even simple grinding to the particle range desired is uncomplicated with the components used.

In contrast, citric acid per se in untreated form often is found to be difficulty grindable to the particle size range desirable and/or possesses such hygroscopic properties that it can be maintained in non-agglomerated fine particle size only with considerable difficulty and expense. Certain additives have been suggested in the prior art to aid in solubilizing the same, e.g. sodium alkyl aryl sulfonates, polyoxyethylene sorbitan monolaurates, and the like surfactants (all of which leave something to be desired). And numerous known beverage additives have been suggested by prior art workers, including anti-oxidants, clouding oils, phosphates, buffer salts, etc., the use of any of which is not precluded by the instant invention.

In contrast, the instant invention is concerned with uses or methods of preparing certain compositions and/or such compositions per se, as concentrates and/or in foods adapted for human consumption wherein the compositions have an acidulant component consisting essentially of (I) an acidulant that is per se water-insoluble,[1] intimately admixed with ($x$) water-soluble alpha-sulfo anionic surfactant and ($y$) water-soluble nonionic surfactant whose molecule consists essentially of chemically separate and distinct hydrophobe and hydrophil groups connected by linkages selected from the group consisting of a direct chemical bond, —O—, —CONH—, —COO— and phenylene, ($x$) and ($y$) each being present in amounts of substantially 0.001% to 1% of the weight of such acidulant sufficient to render the acidulant readily water-dispersible, said admixture (I)($x$)($y$) being a substantially homogeneous, free-flowing, non-toxic, dry particulate mixture having a particle size range of substantially 25 to 250 microns.

The acidulant component used in the practice of the instant invention is designated usually herein by (I) and this acidulant (I) component may include fumaric, adipic, tartaric, malic, lactic,[2] and citric[2] acid, and edible, non-toxic salts thereof and/or mixtures of such acids and/or their edible non-toxic salts, e.g., the sodium salts of these acids which are often used. Among these acidulants, in particular, fumaric and adipic acid are considered in the art to be relatively water-insoluble. These last-mentioned acidulants also tend to dust quite readily when reduced to powder form in the absence of other additives, e.g., in a ball mill or other conventional pulverizer; but they are not hygroscopic like citric acid, which does not grind very readily and although it is not inclined to dust undesirably, it does pick up water by virtue of its hygroscopic character and will tend to agglomerate during storage (whether or not sweeteners such as sugar or the like have been mixed therewith in substantial quantities). The invention contemplates the preparation of compositions adapted for human consumption which do consist essentially of one or more of the foregoing acidulants (I) and preferably a substantial quantity of one or more of the foregoing acidulants which is classifiable as substantially water-insoluble, in that it is not capable of qualifying as a rapidly water-soluble material in accordance with the simple test procedures herein described. It is not important that textbooks may specify the water-solubility of some of these materials, indicating the same to have a measurable water-solubility, for the reason that such materials as fumaric acid are so slowly soluble that their alleged water-solubility is not practical and does not qualify under the tests that are significant from a marketability point of view and that are described herein. Instead, the acidulant component (I) that is treated herein with the various additives and is reduced to powder form pursuant to the pro-

---

[1] An acidulant that, in the absence of the other ingredients herein specified, will itself give the appearance of water insolubility under the conditions of use, even though it might exhibit some water-solubility after prolonged exposure to water for times not considered practical for the contemplated conditions of use.

[2] Although both lactic and citric acids per se have good water-solubility, the improvement of the invention is still obtained when these materials are used in small (25% or less) amounts with the other acidulants.

cedures of the instant invention is thus converted to a marketable water-solubility for the uses herein contemplated.

The sweeteners that are ordinarily used, at least in the end use in the practice of the instant invention, are designated by (II). These are also flavors as previously indicated, whereas all of the remaining flavors other than (I) and (II) are designated by the more generic designation as merely "other flavors" (III). Such sweeteners include the natural sweeteners such as sugars, dextrose, sucrose, fructose, etc., plus the low calorie, dietetic sugar substitutes such as saccharins, etc. In general, the sweeteners (II) are used in combination with the acidulant (I) in proportions required to obtain a particular desired taste, so the selection of the relative proportions by weight between (I) and (II) will vary depending upon the particular use contemplated, but such variation is within the skill of the ordinary food chemist. The relative proportions will ordinarily vary between about 1:1 to about 1:20 for (I):(II), on a weight basis.

The other flavors (III) will ordinarily include the conventional fruit flavors and syrups which may be natural extracts or they may be synthetic. These are very numerous and need not be recited in specific detail herein because the literature spells out the various types of these flavors (III) in great detail. In general, all of the natural and/or synthetic flavors (III) of this type are adapted for use with acidulants (I) and sweeteners (II) and the literature even describes their use in this manner in substantial detail, such that it is not necessary to review the same herein. It is sufficient to note that such flavors (III) are employed in the art and they are employed in the practice of the instant invention in conventional amounts and in conventional manner. The use of such flavors (III) with the particular acidulant component (I) of the instant invention does involve the use of such acidulant (I) in its environment and because of the treatment of such acidulant (I) in accordance with the instant invention the use of these materials in this environment is greatly enhanced.

Still another general class of ingredients (IV) that are used in many beverages, preserves, jams, jellies, drugs, pharmaceuticals, and the like, not only in accordance with the teachings of the prior art, but also to a great advantage in the practice of the instant invention because of the improvement in the acidulant component (I) which the instant invention affords, includes such materials as the various sequestering agents, antioxidants, gelations agents, fats and oils, effervescent salts, coloring agents, etc., all of which are used in the instant edible compositions or food compositions in relatively minute amounts and in the form of non-toxic palatable, edible materials. Their use in fluids of this type is known and understood by the skilled workers in the art and need not be described in great detail herein, since it is merely sufficient to point out that the treatment of the acidulant component (I) does not in any way subtract from or otherwise impair the use of these additives and/or ingredients (IV). Instead, the improved acidulant component (I) obtained in the practice of the instant invention makes possible improvements in the use of these various additives (IV), particularly in the concentrated forms and in the powder concentrates especially, since the practice of the instant invention affords improvements in screening, dust reduction, non-agglomeration, etc.

Considering now the two surfactant components ($x$) and ($y$) that are used in the practice of the instant invention, it is important to note that ($x$) is an alpha-sulfo anionic surfactant and ingredient ($y$) is a certain nonionic surfactant. As will be seen hereinafter the weight ratios of ($x$):($y$) may range from about 1:20 to 20:1 to suit the particular needs involved, although the anionic ($x$) is usually used in as much or somewhat more quantity by weight than the nonionic ($y$), so the preferred proportions are about 1:1 to about 10:1 for ($x$):($y$).

It will be appreciated that in connection with the alpha-sulfo surfactant material ($x$), this material is preferably a diester of the type described; but it may also preferably have the following structural formula:

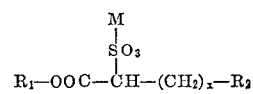

wherein each of the various substituents is palatable and non-toxic in character, M is H or a non-toxic cation such as Na, K, or $NH_4$, or $R_1$; $R_1$ is a $C_2$–$C_{20}$ aliphatic group; $x$ is an integer from 1 to 10; and $R_2$ is selected from the group consisting of $C_6$–$C_{20}$ aliphatic radicals and groups having the structure

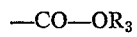

wherein $R_3$ is a $C_7$–$C_{11}$ aliphatic group. The total number of C's in the aforesaid surfactant compound should preferably not exceed about 30. Specific compounds useful for our purpose have the following formula:

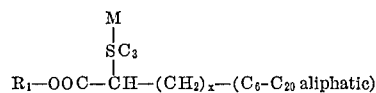

In particular, it will be noted that the radical $R_1$ should be ethyl or a higher aliphatic grouping so that it will be of edible character, as contrasted to the methyl group which may hydrolyze to function as a non-edible, denaturant. The use of the methyl group is, however, not precluded herein because the procedure of the instant invention calls for operating conditions which substantially preclude hydrolysis. Preferably, however, the radical $R_1$ is within the range of $C_2$–$C_8$. Preferably also the radical M is sodium or potassium or even H, in that it is inexpensive and readily available for this particular use. The combination of the "subscript" $x$ and the aliphatic group shown in the last formula as representative of the radical $R_2$ should be such that the chain length is sufficient to carry out the surfactant function, which would mean that the chain length is at least $C_6$ in most instances. The compounds of this particular type are described in substantial detail in application Ser. No. 189,718, filed Apr. 24, 1962 now abandoned, and their preparation is also described in considerable detail. Any of the compounds of the category previously specified herein and also disclosed in the aforesaid application are used in the practice of the instant invention in place of and in substantially the same concentrations as those specified for the dioctyl sulfo succinate hereinbefore mentioned in the aforesaid table. Typical examples include the sodium or calcium salts of alpha-sulfo laurate or stearate esters of ethanol, hexanol, and the like materials, each of which is used for the previously mentioned dioctyl sodium sulfo succinate in the aforesaid table to obtain correspondingly good results. It should be pointed out that dioctyl sulfo succinate is preferred for use in the practice of the instant invention because of its availability and because of the familiarity with its properties and characteristics generally, but the various other alpha-sulfo compounds just described may also be used in the practice of the instant invention in substantially the same proportion ranges and with at least comparable results.

Still another alpha-sulfo anionic surfactant ($x$) useful in the practice of the invention is a commercially available ingredient having the general formula:

$$C_6 \text{ alkyl-OOC—CH}_2$$
$$C_6 \text{ alkyl-OO—C—CSO}_3 M$$
$$C_6 \text{ alkyl-OO—C—CH}_2$$

It will be understood that the $C_6$ alkyl (i.e. hexyl) group used herein may be substituted, in part or in whole, by $C_7$–$C_{18}$ alkyl groups and M has the meaning previously given, but preferably is Na for economic reasons.

The amounts of the surfactant ingredients ($x$) and ($y$) used in the practice of the instant invention are preferably quite minute, which is a distinct advantage in the invention from an economic point of view as well as from the point of view of the addition to the instant food formulations of such surfactants (which would ordinarily not be classified as a food ingredient, even though they are edible, non-toxic, palatable and otherwise in no way detrimental to food compositions). In fact, amounts of as little as 0.01% to as much as about 1% of the weight of the acidulant (I) are used in the practice of the invention for the anionic surfactant ($x$) and also for the nonionic surfactant ($y$). Preferably the amount used for each of these ingredients ($x$) and ($y$) is less than 0.1% by weight of the acidulant (I); and in certain instances when larger amounts of either surfactant ($x$) and/or ($y$) may be employed for one particular use or another, it is found that the use of these materials in quantities above about 1% of the weight of the acidulant (I) does not produce any particularly useful or helpful result. Of course, greater quantities could be used but there is not any particular necessity for such greater quantities. In fact, the best results obtained in the practice of the instant invention appear to involve the use of about 0.07% of the anionic surfactant ($x$) and about 0.05 to perhaps 0.02 or 0.03% of the nonionic surfactant ($y$), as will be described in greater detail hereinafter in the specific examples.

Referring now specifically to the nonionic surfactant ingredients ($y$), it will be appreciated that all nonionic surfactants heretofore known in the art are not useful in the practice of the instant invention and/or equal to each other in the practice of the instant invention. Instead, certain selected nonionic surfactants have been found to meet the requirements of the instant invention and to be particularly useful herein and these will be described in specific categories hereinafter. In general, however, they do involve the conventional nonionic hydrophobe-hydrophil balance in the molecule, whereby there are chemically separate and distinct hydrophobe and hydrophil groups in the molecule. The hydrophobe groups may be aliphatic chains (preferably about $C_6$–$C_{18}$ alkyl groups) or they may be polypropoxide groups (when the hydrophil group in the molecule is a polyethoxide chain). As will be seen hereinafter, if the hydrophobe group is a typical long chain aliphatic group such as a $C_6$–$C_{18}$ alkyl group, then the hydrophil group in the nonionic surfactant is preferably a polyethoxide group or chain, but it may be a polypropoxide group or chain in certain instances. Fundamentally, this is a matter of balancing the hydrophil and hydrophobe groups in any particular nonionic surfactant and the selection of both of these groups in order to obtain a surfactant hydrophobe-hydrophil balance is understood by those skilled in the art. Of course, if the hydrophobe group in a particular nonionic is formed of a polypropoxide chain, then the hydrophil group cannot be a polypropoxide chain and is preferably a polyethoxide chain or group.

In the selection of the nonionic ingredient ($y$), the skilled worker also appreciates that the hydrophobe and hydrophil groups must be linked together by certain selected linkages, which in the practice of the invention include a simple bond, a simple oxygen linkage (—O—), the ester linkage (—COO—), the amide linkage (—CONH—) and the phenylene groups. These groups used for interconnecting the hydrophil and hydrophobe groups in the practice of the instant invention have been found to provide distinctly superior nonionic surfactant ingredients ($y$) for use in the practice of the invention, as the examples hereinafter will show.

Referring specifically to individual categories of nonionic surfactants that have been found to be exceptionally useful in the practice of the instant invention, it will be noted that one nonionic surfactant ($y_1$) has the formula $C_6$–$C_{18}$ alkyl —CONH—$(C_3H_6O—)_m$—$(C_2H_4O—)_n$—H wherein $m$ is substantially 4 to 60 and $n$ is substantially 4 to 60, ($x$) and ($y$) each being present in amounts of substantially 0.001% to 1% of the weight of such acidulant sufficient to render the acidulant readily water-dispersible, said admixture (I)($x$)($y$) being a substantially homogeneous, free-flowing, non-toxic, dry particulate mixture having a particle size range of substantially 25 to 250 microns. One commercial embodiment of the foregoing compound that is used as a commercial nonionic surfactant is a blend of $C_7$–$C_9$ alkyl amide wherein $m$ is substantially 10 and $n$ is substantially 5. This particular nonionic ($y_1$) is an essentially non-foaming wetting agent that is particularly useful herein. In a more generic sense the nonionic surfactant ($y_1$) has the general formula $C_6$–$C_{18}$ alkyl —CONH—(—$R_6O$—)$_p$—H wherein $R_6O$ is ethoxide or propoxide and $p$ is substantially 4 to 60, and $R_6O$ is preferably a combination of ethoxide and propoxide units in unit ratios of 1:5 to 5:1. As indicated previously the combination of ethoxide and propoxide units preferably involves that shown in the commercial embodiment wherein the propoxide chain has substantially about 10 units for the subscript $m$ and the ethoxide chain has preferably substantially 5 units for the subscript $n$. Other alkoxylated amides that may be used in the practice of the invention include lauric monoethanol amide that has been ethoxylated with 10 mols of ethylene oxide, and lauric monoethanol amide ethoxylated with 20 mols of ethylene oxide or even with 30 mols of ethylene oxide. These materials are also commercially available, but the previously mentioned commercial ingredient containing a significant number of propoxide groups has a distinct advantage in that it is a non-foaming wetting agent and the creation of substantial quantities of foam is not necessarily desired in the practice of the instant invention, although it might be particularly useful in carbonated beverages or some specialty type of use.

Still another nonionic ingredient ($y_2$) used in the practice of the invention is available commercially in the form of: $C_6$–$C_{18}$ alkyl —O—(—$C_2H_4O$—)$_n$—(—$C_3H_6O$—)$_m$—H wherein $m$ is substantially 4 to 60 and $n$ is substantially 4 to 60. In the commercial embodiment preferred for use in the practice of the instant invention a $C_7$–$C_9$ blend of linear alkyl groups is used and $n$ is substantially 6.5 and $m$ is substantially 10. Again, it will be appreciated that a more generic nonionic surfactant in this category ($y_1$) has the following formula: $C_4$–$C_{18}$ alkyl —O—(—$R_4O$—)$_q$—H wherein $R_4O$ is ethoxide or propoxide and $q$ is substantially 4 to 60, and $R_4O$ is preferably a combination of ethoxide and propoxide units in unit ratios of 1:5 to 5:1. In such instance the ethoxide and propoxide chains are preferably separate individual chains, as indicated in the previously shown commercial embodiment of nonionic surfactant ($y_2$). It will also be understood that lauryl alcohol ethoxylated with 10 mols, 20 mols or even 30 mols of ethylene oxide may also be used in the practice of the invention. These last-mentioned nonionic surfactants are known and commercially available; but the nonionic surfactant ($y_2$) which also contains a propoxide chain, such as the previously mentioned commercially available ingredient, is particularly preferred among the compounds of this category ($y_2$) primarily for the reason that those compounds containing the propoxide chain in this particular category ($y_2$) have the advantage of being non-foaming wetting agents.

In addition, in the general category of nonionic alkoxylated alcohol ($y_2$) it will be appreciated that the hydrophobe group is a long chain alkyl group and this permits the use of either ethoxide or propoxide or combinations thereof as the hydrophil group to balance the hydrophobe-hydrophil system in the instant category of nonionic surfactants ($y_2$). Thus, commercially available surfactants also particularly useful in the practice of the instant invention have an alkyl group of a blend of $C_8$–$C_{10}$ linear alkyl groups and preferably a $R_4O$ group which contains from 5 to 40 propoxide units. Such compounds are commercially available wherein only propoxide units are employed and $q$ is substantially 7 in one commercial embodiment and in another $q$ is substantially 34.4. These nonionic surfactants thus have respectively about 535 and 2325 molecular weights and they are useful in the practice of the instant invention because of their non-foaming wetting properties.

Still another category of nonionic surfactants ($y_3$) that is available commercially and may be used in the practice of the instant invention has the following formula: $C_6$–$C_{18}$ alkyl $$-COO-(-C_2H_4O-)_n-H$$

wherein $n$ is substantially 4 to 60. In the commercial embodiment of the foregoing ester structure the alkyl group is substantially $C_{18}$ and the subscript $n$ is substantially about 40. It will be understood, however, that the ethoxide chain herein may again be replaced by propoxide and/or combinations of ethoxide and propoxide chains such as are previously described herein for the ether and amide nonionic types ($y_2$) and ($y_1$) respectively, and a shorter $C_8$–$C_{10}$ alkyl blend may preferably be used for the alkyl group.

It will thus be seen that the nonionic surfactants ($y_1$), ($y_2$) and ($y_3$) can be described as a subgeneric category ($y_4$) of nonionic surfactant useful in the practice of the instant invention, having the following formula: $C_6$–$C_{18}$ alkyl —$R_5$—$(R_4O-)_q$—H wherein $R_5$ is selected from the group consisting of —O—, —CONH— and —COO—; and $R_4$ and $q$ have the meanings hereinbefore defined.

Still another nonionic surfactant ($y_4$) that may be used in the invention contains (as $R_5$) the phenylene linkage, which may, of course, have up to 3 $C_1$–$C_4$ alkyl groups on nuclear C's therein but is preferably unsubstituted. The surfactant ($y_4$) may thus have the formula:

$$C_6\text{–}C_{18}\text{ alkyl }-R_5-(-R_4O-)_q-H$$

wherein $R_5$ is the phenylene group and $q$ has the meaning previously given. The most commonly used (and preferred) of this class are the ethoxylated isooctyl and nonyl phenols.

In still another nonionic surfactant ($y_5$) category $R_5$ is merely a chemical bond, although such bond is not a C—C bond. Instead the $R_5$ bond is a C—O bond as it may appear in the following formulae:

$$HO-(-C_3H_6O-)_m-(-C_2H_4O-)_n-H$$

or $$HO-(-C_2H_4O-)_{n_1}-(-C_3H_6O-)_m-(-C_2H_4O-)_{n_2}-H$$

wherein $m$ and $n$ each have their previous meanings and $n_1$ plus $n_2$ equals $n$.

A practical test used in evaluating formulations of the invention, in which all materials used are those available as commerical (food) grade materials, involves (a) ball milling a charge of dry acidulant initially for one hour, (b) then adding the selected anionic surfactant (AS) and/or nonionic surfactant (NS) formulations to be tested and ball milling the same with the acidulant for four additional hours, (c) next the milled material is passed through a 100 mesh screen and the ease and ability with which the formulation undergoes such screening without agglomeration, etc. is graded as very good (VG), good (G), fair (F) and poor (P), as indicated under the heading "Screening" in the subsequent tables, (d) also, at substantially the time of screening the formulation is graded by the operator for its lack of (undesirable) dusting characteristics as excellent (E), very good (VG), good (G), fair (F) and poor (P), as indicated under the heading "Dusting" in the subsequent tables.

Then, (e) 1.45 g. of the milled and screened acidulant formulation is mixed with 5.65 g. of "Kool Aid" base (commercial dry mixture of substantially 5 g. of granuated sugar plus conventional additive such as fruit flavor, color, etc.) and this mixture is stirred by conventional vortex stirring into one quart of cold water at 4° to 6° C. (which is considered to be one typical procedure for use of the formulations of the invention), and at this time the operator makes an immediate initial grading of wetting (desirable) characteristics of the formulated mix. The gradings of the wetting properties appear in the subsequent tables under the heading "Initial Wetting" as very good (VG), good (G), fair (F) and poor (P). After about six minutes of such vortex stirring[3] (which is sufficient time to effect substantially complete solution of the "Kool Aid" base per se in the absence of the acidulant), the operator makes a visual arbitrary numerical grading of "Sinkers" and "Floaters." In the case of the "Floaters," grading of "poor" or "bad" is made on the basis of the relative amount of material that has indicated a tendency to float on the cold water surface during the vortex stirring, but the grading is "OK" if there is no significant indication of such floating material. In the case of "Sinkers," again the grading is on the basis of visual observation during the vortex stirring, but at the end of this initial stirring period some individual particles will often tend to appear insoluble and sink, as discrete particles which can be counted in a given area at the bottom of the vessel. Of course, pure fumaric acid particles of the size tested could thus form hundreds of "sinkers" (even through they would dissolve ultimately with prolonged stirring and/or heating); but the advantage of the invention is to eliminate or at least substantially minimize the number of such "sinkers," which are indicated in the subsequent tables by the number actually counted by the operator. This is a rather arbitrary "count," however; and the ultimate test of marketability in this respect must include such other considerations of ultimate use as (I) the high clarity of the test formulation which makes "zero" ideal and perhaps 10 to 25 maximum passable, or (II) a very dark color, e.g., a grape drink which might make up to 50 passable, or (III) intentionally suspended, insoluble coloring or flavoring which might make up to 100 passable.

It will further be understood that the "Initial Wetting," "Sinkers" and "Floaters" tests are made under conditions of a contemplated commercial use, but those that are probably least favorable with regard to an acidulant such as fumaric acid, in particular. Tests simulating other contemplated uses and/or with other acidulants, e.g., adipic acid, tartaric acid, combined fumaric-citric, etc. are reproduced (but perhaps with less dramatic and/or readily observable results) because of the surfactants employed herein. Other improvements resulting from the invention useing the compositions recited in the tables and/or those in which the acidulants just mentioned are used to replace all or part of the fumaric acid are demonstrated less dramatically in storage stability, resistance to dusting, ease of ball milling and screening, resistance to hygroscopicity, accelerated wetting in conventional jam or preserve production or in initial use of warmer water or in use of other ---
[3] First one minute stirring, then two minutes standing, and next five more seconds stirring.

"base" materials having a greater specific compatibility than the "Kool Aid" base under the test conditions.

TABLE 1A

[All numerical values for surfactants AS and/or NS used are given in percent by weight of the acidulant which is fumaric acid; and the cold water used is not carbonated] [3a]

| Run No. | 1 | 2 | 3 | 4 | 5 | 6 |
|---|---|---|---|---|---|---|
| $AS_1$ [1] | 0.07 | | 0.07 | 0.07 | 0.05 | 0.07 |
| $NS_1$ [2] | | 0.10 | 0.03 | 0.10 | 0.05 | |
| $NS_2$ [3] | | | | | | 0.03 |
| Screening | G | VG | G | G | G | E |
| Dusting | P | G | G | E | G | E |
| Initial wetting | F | P | G | G | F | F |
| Sinkers | 25 | 50 | 10 | 10 | 25 | 25 |
| Floaters | OK | Bad | OK | OK | Poor | OK |

[1] Com. (food) grade di-octyl sodium sulfosuccinate.
[2] Com. (food) grade alkoxylated fatty alcohol: $C_7$-$C_9$ alkyl —O—$(C_2H_4O)_{6.5}$—$(C_3H_6O)_{10}$—H (estimated mol. wt. 1026).
[3] Com. (food) grade alkoxylated fatty amide
$C_7$-$C_9$ alkyl —CO—NH—$\overset{|}{\underset{(CH_3)_2}{C}}$—O $(C_3H_6O)_{10}$—$(C_2H_4O)_5$—H (estimated mol. wt. 1026).
[3a] Comparable results are obtained using carbonated water in Tables 1A through 1H.

TABLE 1B

[All numerical values for surfactants AS and/or NS used are given in percent by weight of the acidulant which is fumaric acid; and the cold water used is not carbonated]

| Run No. | 7 | 8 | 9 | 10 | 11 | 12 |
|---|---|---|---|---|---|---|
| $AS_1$ | 0.07 | 0.07 | 0.07 | 0.07 | 0.07 | 0.07 |
| $NS_1$ | | | 0.03 | | 0.03 | |
| PG [4] | | | 0.02 | 0.05 | | |
| $NS_3$ [5] | 0.03 | 0.07 | | | | |
| Screening | VG | VG | VG | VG | | G |
| Dusting | G | E | G | G | VG | P |
| Initial wetting | P | F | F | F | G | F |
| Sinkers | >100 | 35 | 15 | 25 | <10 | 25 |
| Floaters | OK | OK | OK | OK | OK | OK |

[4] Com. (food) grade propylene glycol.
[5] Com. (food) grade alkoxylated alkyl phenol:

Iso-octyl—⟨ring⟩—O—$(C_2H_4O)_{40}$—H

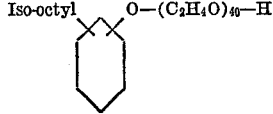

TABLE 1C

[All numerical values for surfactants AS and/or NS used are given in percent by weight of the acidulant which is fumaric acid; and the cold water used is not carbonated]

| Run No. | 13 | 14 | 15 | 16 | 17 | 18 |
|---|---|---|---|---|---|---|
| $AS_1$ | 0.07 | 0.07 | 0.07 | 0.07 | 0.07 | 0.07 |
| $NS_1$ | 0.03 | | | 0.03 | 0.03 | 0.03 |
| PG | 0.07 | | | 0.07 | | |
| $NS_4$ [5] | | 0.10 | 0.10 | | | |
| Screening | VG | F | [6] F | [7] G | VG | [8] VG |
| Dusting | VG | G | G | G | VG | |
| Initial wetting | F | VG | G | F | F | P |
| Sinkers | 25 | 20 | 0 | 0 | 25 | 10 |
| Floaters | OK | OK | OK | OK | OK | OK |

[5] Com. (food) grade alkoxylated fatty alcohol: $C_8$-$C_{10}$ alkyl —O—$(C_3H_6O)_7$—H (estimated mol. wt. 570).
[6] Run 15 was passed through a 325 mesh screen and the formulation so screened was tested.
[7] Run 16 screened and tested same as Run 15.
[8] Run 18 screened and tested same as Run 15.

TABLE 1D

[All numerical values for surfactants AS and/or NS used are given in percent by weight of the acidulant which is fumaric acid; and the cold water used is not carbonated]

| Run No. | 19 | 20 | 21 | 22 | 23 | 24 | 25 |
|---|---|---|---|---|---|---|---|
| $AS_1$ | 0.07 | 0.07 | 0.07 | 0.07 | 0.07 | 0.07 | 0.07 |
| $NS_1$ | 0.05 | | | | | | |
| $NS_5$ [9] | | 0.10 | 0.05 | | | | |
| $NS_6$ [10] | | | | 0.10 | | | |
| $NS_7$ [11] | | | | | | 0.05 | 0.05 |
| $NS_8$ [12] | | | | | 0.05 | | |
| Screening | VG | P | P | P | G | F | [13] F |
| Dusting | VG | E | G | E | E | E | E |
| Initial wetting | G | VG | G | VG | G | G | G |
| Sinkers | 0 | 20 | 5 | 15 | 15 | 12 | 0 |
| Floaters | OK | OK | OK | OK | OK | OK | OK |

[9] Com. (food) grade alkoxylated fatty alcohol: $C_8$-$C_{10}$ alkyl —O—$(C_3H_6O)_{34.4}$—H (estimated mol. wt. 2160).
[10] HO—$(C_2H_4O)_a$—$(C_3H_6O)_{37.4}$—$(C_2H_4O)_c$—H $a$ plus $c=6.6$; mol. wt.=2,560.
[11] HO—$(C_2H_4O)_a$—$(C_3H_6O)_{46}$—$(C_2H_4O)_c$—H $a$ plus $c=15.7$; mol. wt.=3,600.
[12] HO—$(C_2H_4O)_a$—$(C_3H_6O)_{54.5}$—$(C_2H_4O)_c$—H $a$ plus $c=8.2$; mol. wt.=3,800.
[13] Screened through 325 mesh and tested like Run 15.

TABLE 1E

[All numerical values for surfactants AS and/or NS used are given in percent by weight of the acidulant which is fumaric acid; and the cold water used is not carbonated]

| Run No. | 26 | 27 | 28 | 29 | 30 | 31 |
|---|---|---|---|---|---|---|
| $AS_1$ | 0.5 | | 0.07 | 0.07 | 0.07 | 0.07 |
| $NS_8$ | | 0.1 | 0.1 | 0.07 | 0.05 | 0.03 |
| Screening | [14] H | G | H | F | F-G | G |
| Dusting | [14] B | G | E | E | E | E |
| Initial wetting | G | [15] P | VG | G | G | F |
| Sinkers | 10 | 25 | 15 | 15 | 15 | 7 |
| Floaters | 0 | 0 | 0 | 0 | 0 | 0 |

[14] Control run (with excess anionic and no nonionic surfactant) is hard (H) to screen; has bad dusting characteristics; and also has foaming problems in the water.
[15] Control run (without anionic surfactant).

TABLE 1F

[All numerical values for surfactants AS and/or NS used are given in percent by weight of the acidulant which is fumaric acid; and the cold water used is not carbonated]

| Run No. | 32 | 33 | 34 | 35 [a] | 36 [a] | 37 [a] |
|---|---|---|---|---|---|---|
| $AS_1$ | 0.07 | 0.07 | 0.07 | 0.07 | 0.07 | 0.07 |
| $NS_8$ | 0.02 | | | | | 0.03 |
| $NS_6$ | | | 0.05 | | | |
| $NS_7$ | | 0.05 | | | 0.05 | |
| Screening | G | G | F | | | |
| Dusting | G | G | E | P | F | F |
| Initial wetting | F | G | G | F | G | G |
| Sinkers | 15 | 20 | 12 | 10 | 5 | 3 |
| Floaters | 0 | 0 | 0 | 0 | 0 | 0 |

[a] Acidulant used is 80% fumaric and 20% citric.

TABLE 1G

[All numerical values for surfactants AS and/or NS used are given in percent by weight of the acidulant which is fumaric acid; and the cold water used is not carbonated]

| Run No. | 38 | 39 | 40 [a] | 41 | 42 |
|---|---|---|---|---|---|
| $AS_1$ | 0.07 | 0.07 | 0.07 | 0.07 | 0.07 |
| $NS_8$ | | 0.03 | 0.03 | | |
| $NS_9$ | [16] 0.1 | | | | |
| $NS_{10}$ | | | | [18] 0.05 | |
| $NS_{11}$ | | | | | [19] 0.05 |
| Screening | F | [17] G | [17] G | P | P |
| Dusting | VG | G | G | G | G |
| Initial wetting | VG | VG | VG | F | F |
| Sinkers | 40 | 1 | 1 | 35 | 35 |
| Floaters | OK | OK | OK | OK | OK |

[a] Acidulant used is 80% fumaric and 20% citric.
[16] Com. (food) grade alkoxylated fatty alcohol stearyl —O—$(C_2H_4O)_{40}$—H.
[17] Screened through 200 mesh screen.
[18] Com. (food) grade alkoxylated alkyl phenol nonyl—⟨ring⟩—$(C_3H_6O)_{22}$—$(C_2H_4O)_{37}$—H

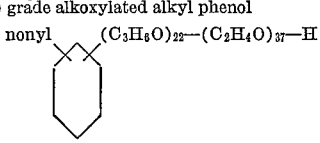

[19] Com. (food) grade "Tergitol XD" understood to be: butyl —O—$(C_3H_6O)_{30}$—$(C_2H_4O)_{25}$—H.

TABLE 1H

[All numerical values for surfactants AS and/or NS used are given in percent by weight of the acidulant which is fumaric acid; and the cold water used is not carbonated]

| Run No. | 43 | 44 | 45 | 46 | 47 |
|---|---|---|---|---|---|
| $AS_2$ [20] | 0.10 | | | | |
| $AS_3$ [21] | | 0.10 | | | |
| $AS_4$ [22] | | | 0.10 | | |
| $AS_5$ [23] | | | | 0.10 | |
| $AS_6$ [24] | | | | | 0.07 |
| $NS_1$ | 0.05 | 0.05 | 0.05 | 0.05 | 0.05 |
| Screening | P | P | F | F | P |
| Dusting | G | VG | VG | F | F |
| Initial wetting | F | G | P | F | F |
| Sinkers | 35 | 50 | 50 | 35 | 20 |
| Floaters | OK | OK | OK | | OK |

[20] Com. (food) grade alkaryl sulfonate straight chain ($C_{12}$)

alkyl—⟨ring⟩—$SO_3Na$

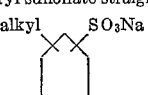

[21] Com. (food) grade Sodium alpha-sulfo methyl myristate.
[22] Com. (food) grade sodium 2-ethylhexyl sulfate.
[23] Com. (food) grade sodium aluryl sulfate.
[24] Com. (food) grade sodium salt of compound shown on page 21 hereof.

As indicated on Table 1F, runs 35, 36 and 37 show the use of a combination of relatively water insoluble fumaric acid and citric acid (which is known to be comparatively more water-soluble). It will be appreciated that even citric acid per se is not what one would classify as highly water-soluble, when compared to the various surfactants here employed. In fact, run 35 shows that the failure to use the combination of surfactants herein contemplated does not result in extremely good wetting properties in the powdered acidulant composition, even though it does contain 20% citric acid. In fact, the invention contemplates the use of the hereinafter claimed combination of surfactants with an acidulant ingredient or combination of acidulant ingredients in such a manner that the resulting composition will have improved water wetting and water-solubility. As previously mentioned the water-solubility herein referred to is a practical consideration meaning speed and ease of water-solubility (as contrasted to whatever water-solubility might be obtained upon prolonged standing for impractical lengths of time). In general, citric acid is known to have fairly good water-solubility but the use of the combination of surfactants here involved with citric acid alone and/or with citric acid combined with other acidulants does result in improved water wetting and water-solubility in the resulting acidulant composition. It has been found, however, that still greater improvements in water wetting and water-solubility may be obtained in the practice of the instant invention if the acidulant component (I) of the overall acidulant composition contains from about 1% to about 40 or 50% by weight of the total acidulant component of citric acid, in combination with such acidulants as fumaric acid and/or adipic acid which are recognized as being comparatively highly water insoluble under the conditions of use. Of course, even the use of an acidulant component consisting substantially entirely of citric acid in the practice of the instant invention will result in improvements in the water wetting and water-solubility characteristics of the resulting acidulant composition; but such improvements in the case of an acidulant composition wherein the acidulant component (I) is substantially entirely citric acid are not as conspicuous as the improvements that are obtained when the acidulant component comprises substantial quantities of the previously mentioned comparatively water insoluble or the previously mentioned very poorly and/or very slowly water-soluble acidulants such as fumaric acid and adipic acid. Substitution of adipic acid for fumaric acid in runs 35, 36 and 37 result in comparable demonstrations of the improvements afforded in the practice of the instant invention. This is also true if the fumaric acid in runs 26 through 34 (on the previous tables) is replaced wholly or in part with adipic acid, tartaric acid, malic acid, and/or (10%) lactic acid. Typical substitutes for the fumaric in such runs are 50% fumaric-50% adipic, 100% adipic, 100% tartaric, 50% fumaric-50% tartaric, 50% fumaric-50% malic, 90% fumaric-10% lactic and 90% fumaric-10% citric.

As indicated previously, in the tests here involved, granulated sugar is used in the "Kool Aid" base, but substantially the same results are obtained using the known non-caloric substitutes for sugar, e.g. saccharin per se, or the presently employed commercial combination of saccharin and cyclamate, all of which materials have comparatively ready solubility and thus function in substantially the same manner as the granulated sugar functions in the previously described runs. Essentially the sweetener component, any flavor or syrup component, and/or any various miscellaneous additives such as sequestrants, antioxidants, effervescent salts, coloring agents, and the like which are used in the practice of the instant invention are those presently used commercially and their use per se is fully understood by food and flavor chemists. Essentially, these ingredients possess the desired water-solubility so that they are rapidly dissolved and/or intimately dispersed throughout the aqueous system and they do not subtract from the observable improvement in water wetting and water-solubilizing of the acidulant component, as shown in the runs described in greater detail in the previous tables.

As indicated in Table 1H, the anionic surfactant preferably employed in the practice of the instant invention is an alpha-sulfo surfactant, particularly preferred materials being indicated in the tables as $AS_1$, $AS_3$, and $AS_6$. The ingredient AS is typical of the salts of alpha-sulfo alkyl fatty acid esters which have been described hereinbefore in greater detail. Typical of this class of compounds which are substituted for the ingredient $AS_3$ in a procedure corresponding to run No. 44 include sodium alpha-sulfo ethyl palmitate, sodium alpha-sulfo isopropyl myristate, sodium alpha-sulfo methyl stearate, and mixtures thereof, each of which components is used in place of the material presently specified on Table 1H, run 44, in order to obtain comparable results. It will be appreciated that the results shown generally on Table 1H are not necessarily the best results that are obtained in the practice of the instant invention but they are typical of the fact that an improvement in water wetting and water-solubility properties are obtained in the practice of the instant invention using various anionic surfactants, typical members of which are shown on Table 1H.

Also, in run No. 46 the sodium lauryl sulfate is replaced by sodium myristyl sulfate, the sodium sulfate of penta-ethoxy stearyl alcohol, etc. In general, the anionic surfactants indicated generally on Table 1H by the typical examples $AS_4$ and $AS_5$ include the $C_{10}$–$C_{18}$ alkanol sulfates and the sulfates of the corresponding alcohols which have been ethoxylated with 2 to 40 mols of ethylene oxide. The results obtained by the selected use of anionic surfactants of this category are conspicuously superior to control runs when no anionic surfactant and/or wetting agent of this type is used.

Referring to the use of the anionic surfactant $AS_2$ in run 43, it will be appreciated that straight chain alkyl benzene sulfonates are now preferred for use. The straight chain alkyl group is preferably a $C_8$–$C_{18}$ alkyl group.

In general, the anionic surfactant performs an important function with respect to accelerated wetting of the composition when initially introduced into an aqueous system, but the combination of the anionic surfactant with the nonionic surfactant effects a type of synergism resulting in distinctly superior results. Among the preferred results obtained in the practice of the instant invention, one may itemize the following:

(1) Effective wetting, dispersing and solubilizing acidulant-surfactant combinations, generally containing very minute amounts of surfactant combination $(x)(y)$ of as little as 0.15% and less.

(2) Generally reduced foaming properties of such combinations or compositions.

(3) Very marked reduction and/or elimination of typical water insolubility, delayed water-solubility, and/or non-wetting properties typical of acidulants per se, and marked reduction and/or elimination of particle agglomeration, as evidenced by excessive amounts of "floaters" and/or "sinkers" after cold water mixing.

(4) Distinctly improved anti-dusting properties.

(5) Greatly expedited as well as complete solution under dispersion of the acidulant in water so as to obtain clear systems.

(6) Improved resistance to caking in the powder form and improved free-flowing particulate form of acidulant-surfactant composition.

(7) Humectant properties improved.

(8) Improved dry particle blending characteristics, for purposes of blending with particulate sweeteners, etc.

(9) Improved milling and/or grinding characteristics, affording rapid grinding and uniform particle size formation.

As previously indicated the alpha-sulfo anionic surfactants are preferred for use in the practice of the instant invention and they are preferably used in combination with the non-ionic surfactants hereinbefore described as ingredient $(y_5)$. Typical ingredients of this class include $NS_6$, $NS_7$ and $NS_8$. The non-ionic surfactant indicated as NS₈ has been found to give the best results in combination with AS₁, but the non-ionic surfactants of this general category ($y_5$) that appear to give the best results in the practice of the instant invention have molecular weights of 2000 or more.

The invention also contemplates the use of certain typical glycol type additives (excluding, of course, the toxic ethylene glycol), which materials include propylene glycol, glycerol, and the low molecular weight polyoxyethylene and/or polyoxypropylene glycols. As indicated in run No. 9, these materials are used in small amounts comparable to the amount of non-ionic surfactant and their use in some instances contributes to the overall improved synergistic action. It will be understood that reference to compositions consisting essentially of the anionic and non-ionic surfactant in the claims hereinafter do not preclude such low molecular weight glycol additives and/or wetting aids. The non-ionic surfactants used in the practice of the instant invention, as well as those which appear to be distinctly preferred, have been described herein with considerable particularity. The anionic surfactant used in the practice of the instant invention is preferably an alpha-sulfo surfactant, also described herein with particularity, but various other known anionic surfactants may also be used in the practice of the instant invention and it has already been indicated that these include the alkaryl sulfonates as well as the alcohol sulfate (which include the alkoxylated alkanols that are sulfated and neutralized).

It will be understood that the improvements of the invention when water-soluble acidulants (e.g. citric and lactic acids) are used become apparent when these materials represent relatively small proportions of the total acidulant component. In fact, the terms "water-soluble" and "water insoluble" as used herein have reference to the environment and concentration actually involved. Thus, in the case of some of the surfactants (e.g. particularly certain polyalkoxides having very low water-solubility per se), reference to such materials as being water-soluble implies the use of functionally water-soluble smaller amounts or concentrations.

Also, it is usually preferred to use a sweetener (II) to acidulant (I) ratio of 1:1 to 20:1, for (II):(I); but in some instances the amount of acidulant (I) can be much greater thus resulting in (II):(I) ratios as low as 1:20.

It will be understood that modifications and variations may be effected without departing from the spirit and scope of the novel concepts of the present invention.

We claim as our invention:

1. A composition adapted for human consumption consisting essentially of (I) an acidulant that is per se water-insoluble, intimately admixed with ($x$) water-soluble alpha-sulfo anionic surfactant and ($y$) water-soluble non-ionic surfactant whose molecule consists essentially of $C_6$—$C_{18}$ alkyl
—CONH—($C_3H_6O$—)$_m$—(—$C_2H_4O$—)$_n$—H
wherein $m$ is substantially 4 to 60 and $n$ is substantially 4 to 60, ($x$) and ($y$) each being present in amounts of substantially 0.001% to 1% of the weight of such acidulant sufficient to render the acidulant readily water-dispersible, said admixture (I)($x$)($y$) being a substantially homogeneous, free-flowing, non-toxic, dry particulate mixture having a particle size range of substantially 5 to 250 microns.

2. A composition adapted for human consumption consisting essentially of (I) an acidulant that is per se water-insoluble, intimately admixed with ($x$) water-soluble alpha-sulfo anionic surfactant and ($y$) water-soluble non-ionic surfactant whose molecule consists essentially of $C_6$—$C_{18}$ alkyl
—CONH—(—$C_3H_6O$—)$_m$—($C_2H_4O$—)$_n$—H
wherein $m$ is substantially 4 to 60 and $n$ is substantially 4 to 60, ($x$) and ($y$) each being present in amounts of substantially 0.001% to 1% of the weight of such acidulant sufficient to render the acidulant readily water-dispersible, said admixture (I)($x$)($y$) being a substantially homogeneous, free-flowing, non-toxic, dry particulate mixture having a particle size range of substantially 25 to 250 microns; and (II) water-soluble sweetener, the weight ratio of (I) to (II) being substantially 1:1 to 1:20.

3. A composition adapted for human consumption consisting essentially of (I) an acidulant that is per se water-insoluble, intimately admixed with ($x$) water-soluble alpha-sulfo anionic surfactant and ($y$) water-soluble nonionic surfactant whose molecule consists essentially of

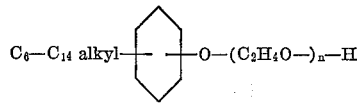

wherein $n$ is substantially 4 to 60, ($x$) and ($y$) each being present in amounts of substantially 0.001% to 1% of the weight of such acidulant sufficient to render the acidulant readily water-dispersible, said admixture (I)($x$)($y$) being a substantially homogeneous, free-flowing, non-toxic, dry particulate mixture having a particle size range of substantially 25 to 250 microns; and (II) water-soluble sweetener, the weight ratio of (I) to (II) being substantially 1:1 to 1:20.

4. A composition adapted for human consumption consisting essentially of (I) an acidulant that is per se water-insoluble, intimately admixed with ($x$) water-soluble alpha-sulfo anionic surfactant and ($y$) water-soluble nonionic surfactant whose molecule consists essentially of $C_6$–$C_{18}$ alkyl —CONH—(—$R_3O$—)$_p$—H wherein $R_3O$ is ethoxide or propoxide and $p$ is substantially 4 to 60, and $R_3O$ is preferably a combination of ethoxide and propoxide units in unit ratios of 1:5 to 5:1, ($x$) and ($y$) each being present in amounts of substantially 0.001% to 1% of the weight of such acidulant sufficient to render the acidulant readily water-dispersible, said admixture (I)($x$)($y$) being a substantially homogeneous, free-flowing, non-toxic, dry particulate mixture having a particle size range of substantially 25 to 250 microns.

5. A composition adapted for human consumption consisting essentially of (I) an acidulant that is per se water-insoluble, intimately admixed with ($x$) water-soluble alpha-sulfo anionic surfactant and ($y$) water-soluble nonionic surfactant whose molecule consists essentially of $C_6$–$C_{18}$ alkyl —CONH—(—$R_3O$—) $_p$—H wherein $R_3O$ is ethoxide or propoxide and $p$ is substantially 4 to 60, and $R_3O$ is preferably a combination of ethoxide and propoxide units in unit ratios of 1:5 to 5:1, ($x$) and ($y$) each being present in amounts of substantially 0.001% to 1% of the weight of such acidulant sufficient to render the acidulant readily water-dispersible, said admixture (I)($x$)($y$) being a substantially homogeneous, free-flowing, non-toxic, dry particulate mixture having a particle size range of substantially 25 to 250 microns; and (II) water-soluble sweetener, the weight ratio of (I) to (II) being substantially 1:1 to 1:20.

References Cited

UNITED STATES PATENTS

| | | | |
|---|---|---|---|
| 3,151,986 | 10/1964 | Van Ness | 99—78 |
| 3,181,953 | 5/1965 | Van Ness et al. | 99—78 |
| 3,250,624 | 5/1966 | Van Ness | 99—78 |
| 3,351,471 | 11/1967 | Demler et al. | 99—78 |

RAYMOND N. JONES, Primary Examiner

R. M. ELLIOTT, Assistant Examiner

U.S. Cl. X.R.

99—2, 28, 35, 31, 100, 122, 116, 129, 136; 252—152, 161, 353, 356, 357; 424—358, 361, 365